United States Patent [19]
Miura et al.

[11] Patent Number: 6,016,042
[45] Date of Patent: Jan. 18, 2000

[54] METHOD OF DETECTING THE ANGLE OF ROTATION AND LOAD TORQUE OF A DC MOTOR, AND APPARATUS OF DETECTING THE ANGLE OF ROTATION AND LOAD TORQUE OF A DC MOTOR

[75] Inventors: Kazunori Miura, Hyogo; Masanori Takagi, Tokyo; Takayuki Kifuku, Tokyo; Shigeki Ohtagaki, Tokyo, all of Japan

[73] Assignee: Mitsubishi Denki Kabushiki Kaisha, Tokyo, Japan

[21] Appl. No.: 08/869,213

[22] Filed: Jun. 4, 1997

[30] Foreign Application Priority Data

Jun. 10, 1996 [JP] Japan ................................. 8-147531

[51] Int. Cl.[7] ....................................................... H02P 1/04
[52] U.S. Cl. ........................ 318/430; 318/432; 318/434; 701/41
[58] Field of Search ...................... 318/430, 432, 318/434, 254, 469, 282, 808, 809, 721, 470, 468; 364/424.051; 701/41; 180/412, 410

[56] References Cited

U.S. PATENT DOCUMENTS

| | | |
|---|---|---|
| 4,205,260 | 5/1980 | Maeda et al. ............................ 318/257 |
| 4,320,331 | 3/1982 | Plunkett ................................... 318/722 |
| 4,473,790 | 9/1984 | Plunkett et al. ......................... 318/298 |
| 4,782,907 | 11/1988 | Morishita et al. ....................... 180/412 |
| 4,904,919 | 2/1990 | McNaughton ........................... 318/798 |
| 5,254,926 | 10/1993 | Miller et al. ............................. 318/798 |
| 5,287,051 | 2/1994 | Konrad et al. ........................... 318/803 |
| 5,486,748 | 1/1996 | Konrad et al. ........................... 318/811 |
| 5,568,795 | 10/1996 | Robichaux et al. ................. 123/198 F |
| 5,608,300 | 3/1997 | Kawabata et al. ...................... 318/721 |
| 5,629,610 | 5/1997 | Pedrazzini et al. ..................... 323/283 |
| 5,659,472 | 8/1997 | Nishino et al. ............................. 701/41 |
| 5,723,960 | 3/1998 | Harada .................................... 318/469 |
| 5,801,509 | 9/1998 | Sawa et al. .............................. 318/705 |

FOREIGN PATENT DOCUMENTS

07267115  10/1995  Japan .

*Primary Examiner*—David Martin
*Attorney, Agent, or Firm*—Sughrue, Mion, Zinn, Macpeak & Seas, PLLC

[57] ABSTRACT

A method of detecting the angle of rotation of a DC motor includes the steps of: driving the DC motor with a predetermined torque for a predetermined period of time which is selected so that the angular acceleration of the DC motor is substantially constant during the above period of time; and calculating the angle of rotation of the DC motor from the driving time period and the voltage generated by the DC motor after the driving of the DC motor is stopped. This method makes it possible to accurately detect the angle of rotation and the load torque using an apparatus having a simple structure.

21 Claims, 8 Drawing Sheets

METHOD OF DETECTING THE ANGLE OF ROTATION AND LOAD TORQUE OF A DC MOTOR, AND APPARATUS OF DETECTING THE ANGLE OF ROTATION AND LOAD TORQUE OF A DC MOTOR

BACKGROUND OF THE INVENTION

1. Field of the Invention

The present invention relates to a method of detecting the angle of rotation of a DC motor, a method of detecting the load torque, and an apparatus of detecting the angle of rotation of a DC motor, an apparatus of detecting the load torque.

2. Description of the Related Art

In general, locking can occur in the operation of a motor when a trouble occurs in a motor itself or in a transmission mechanism such as a gear for transmitting power from a motor to a load. If such locking occurs in a motor used in a steering system of a car, a steering wheel will be locked, and it will become impossible to control the operation of the steering system.

One known technique to solve the above problem is to mechanically isolate the output shaft of the motor from the steering system by controlling the clutch when an abnormality is detected in the load torque of the motor estimated from the driving current and the angle of rotation or the angular acceleration velocity of the motor.

In the above technique, when neither the angle of rotation nor the angular velocity can be detected for some reason associated with the construction of the motor controller, the motor is driven by a constant current and the load torque is estimated by detecting armature current.

Figure 10:
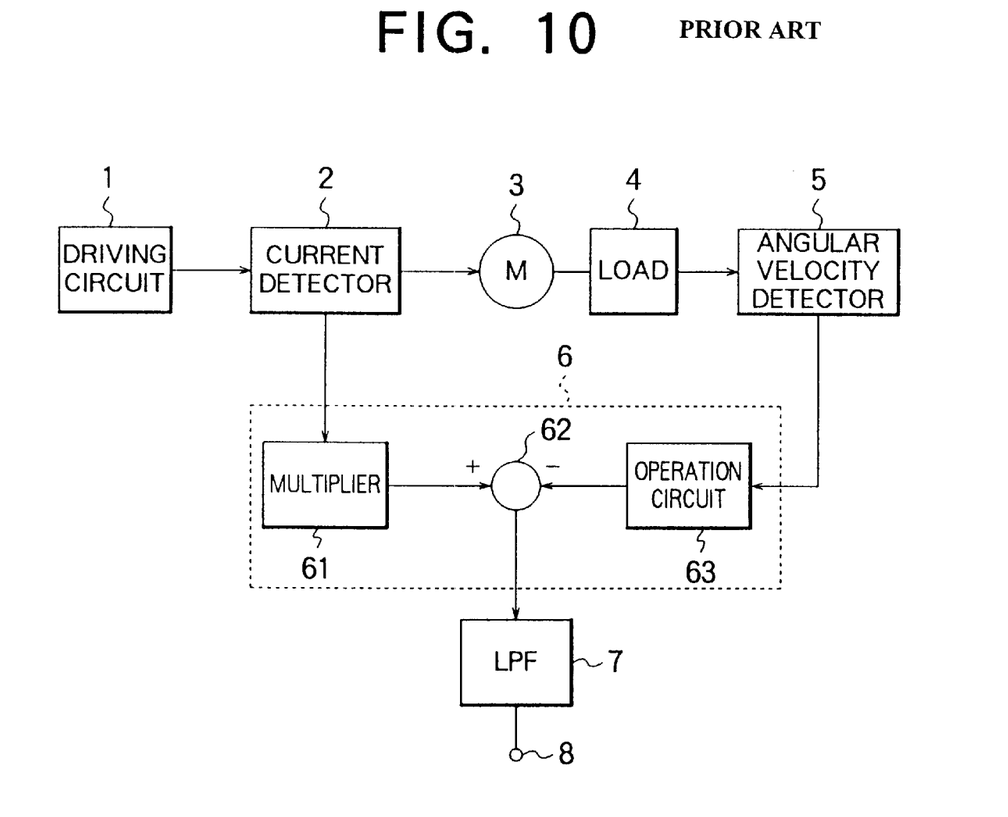
FIG. 10 is a block diagram illustrating a system for estimating the load torque of a DC motor, according to a conventional technique.

FIG. 10 illustrates the method of determining the load torque from the driving current and the angular velocity of a motor, described in "Motion Control" written by Dote and Harashima and published in March, 1993, by Corona Publishing Co. Ltd.

In FIG. 10, a current detector 2 detects a driving current supplied from a driving circuit 1 to a motor 3, and an angular velocity detector 5 constructed with for example a tachometer generator is connected to the motor 3 in such a manner as to detect the angular velocity of the motor 3 on the basis of the load 4 substantially represented by the torque constant of the motor, disturbing torque, the inertia of the motor, and viscous friction coefficient.

The driving current detected by the current detector 2 is supplied to the multiplier of a microcomputer 6 which includes, in addition to the multiplier 61, an adder 62, an operation circuit block 63, and other elements. The multiplier 61 calculates the product of the driving current and the torque constant of the motor. The result is supplied to one of two inputs of the adder 52. On the other hand, the angular velocity detected by the angular velocity detector 4 is supplied to the operation circuit block 63. In the operation circuit block 63, the angular velocity is multiplied by the predetermined inertia of the motor and the resultant product is differentiated. The differentiated value is then added with the product of the angular velocity and the predetermined viscous friction coefficient. The resultant sum is applied to the other input of the adder 62. The adder 62 subtracts the output of the operation circuit block 63 from the output of the multiplier 61. The result is passed through a low-pass filter 7 composed of for example a first-order delay circuit. Thus, the output 8 of the low-pass filter 7 presents an estimated value of the load torque.

The above conventional technique has several problems as described below.

That is, the above method of detecting the angle of rotation of a motor needs a dedicated angle detection device such as an encoder coupled to the motor.

Furthermore, in the conventional method of detecting the load torque of the motor, since the load torque is estimated while driving a motor by a constant current as described above, it is required to use a dedicated current detector and angular velocity detector such as a tachometer generator. If the system has no angular velocity detector such as a tachometer generator or a motor angle detector such as a potentiometer, it is difficult to estimate the load torque or the system will be very expensive even if possible.

For example, it may be possible to detect the angular velocity by detecting the voltage generated by a motor. In general, however, when the motor is being driven, the generated voltage is present in a form of a mixture with a voltage applied to the motor and it is difficult to detect the generated voltage separately from the applied voltage. Therefore, the difficulty in the detection of the load torque using such the technique results in complexity and high cost.

Gradual degradation in the performance of a motor or a gear system and thus a gradual increase in the load torque are more likely to occur than an abrupt failure due to for example incorporation of a foreign substance. Therefore, in the case where a motor is used in the steering system of a car, it is required to detect the load torque as accurately as possible to predict a failure in a car system before an actual occurrence. On the other hand, if a partial short circuit occurs in a coil of a motor, the torque generated by the motor current decreases for a certain time period during one rotation. This ununiformity in the generated torque will give an uncomfortable feeling to a user driving the car.

Accordingly, it is a general object of the present invention to solve the above problems. More specifically, it is an object of the present invention to provide a simple, inexpensive, and reliable method of detecting the angle of rotation and the load torque of a motor. It is another object of the present invention to provide a simple, inexpensive, and reliable apparatus of detecting the angle of rotation and the load torque of a motor.

SUMMARY OF THE INVENTION

According to one aspect of the present invention, there is provided a method of detecting the angle of rotation of a DC motor for driving a predetermined load, the method comprising the steps of: driving the DC motor with a predetermined driving torque for a predetermined driving time period; and calculating the angle of rotation of the DC motor, on the basis of the voltage generated by the DC motor after the driving of the DC motor is stopped. In the above arrangement in which the angular velocity of the DC motor is detected from the voltage generated by the DC motor after the driving of the DC motor is stopped, if the DC motor is driven with a substantially constant angular acceleration, it is possible to accurately determine the angle of rotation of the DC motor from the product of the driving time period and the angular velocity.

In one form of the invention, the predetermined load is a steering system of a mobile body, the steering system is connected to the DC motor through a clutch to be steered or provided auxiliary urging during a steering operation. In this arrangement, it is possible to accurately determine the angle of rotation of the DC motor. This ensures that when an abnormality is detected in the angle of rotation of the DC motor, the DC motor can be isolated from the steering system thereby preventing the steering system from a bad influence due to the abnormality.

In another form of the invention, the mobile body is a vehicle including a clutch control command device for commanding the connecting or isolating operation of the clutch, on the basis of the angle of rotation of the DC motor calculated by a rotation angle calculation device. In this arrangement, it is possible to accurately determine the angle of rotation of the DC motor. This ensures that when an abnormality is detected in the angle of rotation of the DC motor, the DC motor can be isolated from the steering system thereby preventing the steering system from a bad influence due to the abnormality. This arrangement also ensures that a vehicle system can operate with high reliability.

In a further form of the invention, the predetermined driving torque is generated by supplying a current which increases in proportion to time to the DC motor. In this arrangement, it is possible to drive any of various types of DC motors having different moment of inertia so that the DC motor is driven with a substantially constant angular acceleration. This makes it possible to accurately determine the angle of rotation of the DC motor.

In still another form of the invention, the method further comprises the step of calculating the angle of rotation of the DC motor which occurs when the DC motor is driven, on the basis of the voltage generated by the DC motor immediately after the DC motor is driven. In the above arrangement, it is possible to accurately determine the angle of rotation of the DC motor which occurs when the DC motor is driven.

In a further form of the invention, the method further comprises the step of calculating the angle of rotation of the DC motor which occurs when the DC motor is not driven, on the basis of an integral value obtained by integrating the voltages generated by the DC motor after the driving of the DC motor is stopped. With the above arrangement, it is possible to accurately determine the angle of rotation of the DC motor which occurs after the driving of the DC motor is stopped.

In another form of the invention, the method further comprises the steps of: calculating the angle of rotation of the DC motor which occurs when the DC motor is driven, on the basis of the voltage generated by the DC motor immediately after the DC motor is driven; calculating the angle of rotation of the DC motor which occurs when the DC motor is not driven, on the basis of an integral value obtained by integrating the voltages generated by the DC motor after the driving of the DC motor is stopped; and calculating the sum of the angle of rotation which occurs when the DC motor is driven and the angle of rotation which occurs when the DC motor is not driven, thereby calculating the overall angle of rotation including the angle of rotation which occurs when the DC motor is driven and that which occurs when the DC motor is not driven. With the above arrangement, it is possible to accurately determine the overall angle of rotation which has occurred after starting the driving of the DC motor.

In another form of the invention, the driving torque and the driving time period are set to a value equal to or greater than a predetermined value, respectively, so that the DC motor rotates by an amount at least equal to or greater than a predetermined angle when the load torque of the DC motor is a predetermined value. In this arrangement, it is possible to ensure that an increase in the load torque due to incorporation of a foreign substance can be detected and thus preventing mechanical locking.

According to another aspect of the present invention, there is provided a method of detecting the load torque of a DC motor, the method comprising the step of calculating the load torque of the DC motor from the angle of rotation calculated according to the method of detecting the angle of rotation of a DC motor. In this method, it is possible to determine the accurate load torque of the DC motor since the angular acceleration and the angle of rotation during the driven-state decrease as the load torque of the DC motor increases.

According to still another aspect of the present invention, there is provided an apparatus for detecting the angle of rotation of a DC motor for driving a predetermined load, the apparatus comprising: a driving torque control device for driving the DC motor with a predetermined driving torque for a predetermined driving time period; a generated-voltage detection device for detecting the voltage generated by the DC motor after the driving of the DC motor is stopped; and a rotation angle calculation device for calculating the angle of rotation of the DC motor from the voltage generated by the DC motor. In this arrangement, it is possible to accurately determine the load torque of the DC motor since the angular acceleration and the angle of rotation during the driven-state decrease as the load torque of the DC motor increases.

In one form of the invention, the driving torque control device generates a predetermined driving torque by supplying a current which increases in proportion to time to the DC motor. In this arrangement, it is possible to drive any of various types of DC motors having different moment of inertia so that the DC motor is driven with a substantially constant angular acceleration. This makes it possible to accurately determine the angle of rotation of the DC motor.

In another form of the invention, the rotation angle calculation device calculates the angle of rotation of the DC motor which occurs when the DC motor is driven, on the basis of the voltage generated by the DC motor immediately after the DC motor is driven. In the above arrangement, it is possible to accurately determine the angle of rotation of the DC motor which occurs when the DC motor is driven.

In still another form of the invention, the rotation angle calculation device calculates the angle of rotation of the DC motor which occurs when the DC motor is not driven, on the basis of an integral value obtained by integrating the voltages generated by the DC motor after the driving of the DC motor is stopped. With the above arrangement, it is possible to accurately determine the angle of rotation of the DC motor which occurs after the driving of the DC motor is stopped.

In a further form of the invention, the rotation angle calculation device calculates the angle of rotation of the DC motor which occurs when the DC motor is driven, on the basis of the voltage generated by the DC motor immediately after the DC motor is driven, and calculates the angle of rotation of the DC motor which occurs when the DC motor is not driven, on the basis of an integral value obtained by integrating the voltages generated by the DC motor after the driving of the DC motor is stopped, and calculates the sum of the angle of rotation which occurs when the DC motor is driven and the angle of rotation which occurs when the DC motor is not driven, thereby calculating the overall angle of rotation including the angle of rotation which occurs when the DC motor is driven and that which occurs when the DC motor is not driven. With the above arrangement, it is possible to accurately determine the overall angle of rotation which has occurred after starting the driving of the DC motor.

In another form of the invention, the driving torque and the driving time period of the driving torque control device is set to a value equal to or greater than a predetermined value, respectively, so that the DC motor rotates by an amount equal to or greater than a predetermined angle when the load torque of the DC motor is a predetermined value. In this arrangement, it is possible to ensure that an increase in the load torque due to incorporation of a foreign substance can be detected and thus preventing mechanical locking.

In another form of the invention, the apparatus further comprises a DC motor driving device, the DC motor driving device includes an earthing device for connecting one of terminals of an armature of the DC motor to ground, and when the DC motor is not driven, the armature of the DC motors is connected to ground by the earthing device, wherein the generated-voltage detection device detects the voltage generated by the DC motor with respect to the ground voltage. In this arrangement, it is possible to allow simplification in the construction of a circuit for detecting the generated voltage, such as an input interface circuit connected to a microcomputer. Furthermore, the generated voltage can be measured with higher resolution.

In another form of the invention, the DC motor driving device includes a bridge circuit consisting of a plurality of switching devices provided between a DC power supply and the DC motor, for controlling the DC motor to either a forward or reverse direction, and one terminal of the DC motor is connected to ground, and when the DC motor is not driven, a switching device located on the ground side of the DC power supply is turned on to function as the earthing device. In this arrangement, it is possible to allow simplification in the construction of a circuit for detecting the generated voltage, such as an input interface circuit connected to a microcomputer. Furthermore, the generated voltage can be measured with higher resolution.

In another form of the invention, the apparatus further comprises an alarming device for generating an alarm, when the angle of rotation of the DC motor calculated by the rotation angle calculation device is less than a predetermined value. In this arrangement, it is possible to notify a user of the event of the abnormal condition.

According to another aspect of the present invention, there is provided the apparatus comprises a load torque calculation device for further calculating the load torque of the DC motor from the angle of rotation of the DC motor calculated by the apparatus for detecting the angle of rotation of the DC motor. In this method, it is possible to determine the accurate load torque of the DC motor since the angular acceleration and the angle of rotation during the driven-state decrease as the load torque of the DC motor increases.

DESCRIPTION OF THE PREFERRED EMBODIMENT

With reference to specific embodiments, the present invention will be described in further detail below in conjunction with the accompanying drawings.

EMBODIMENT 1

Figure 1:
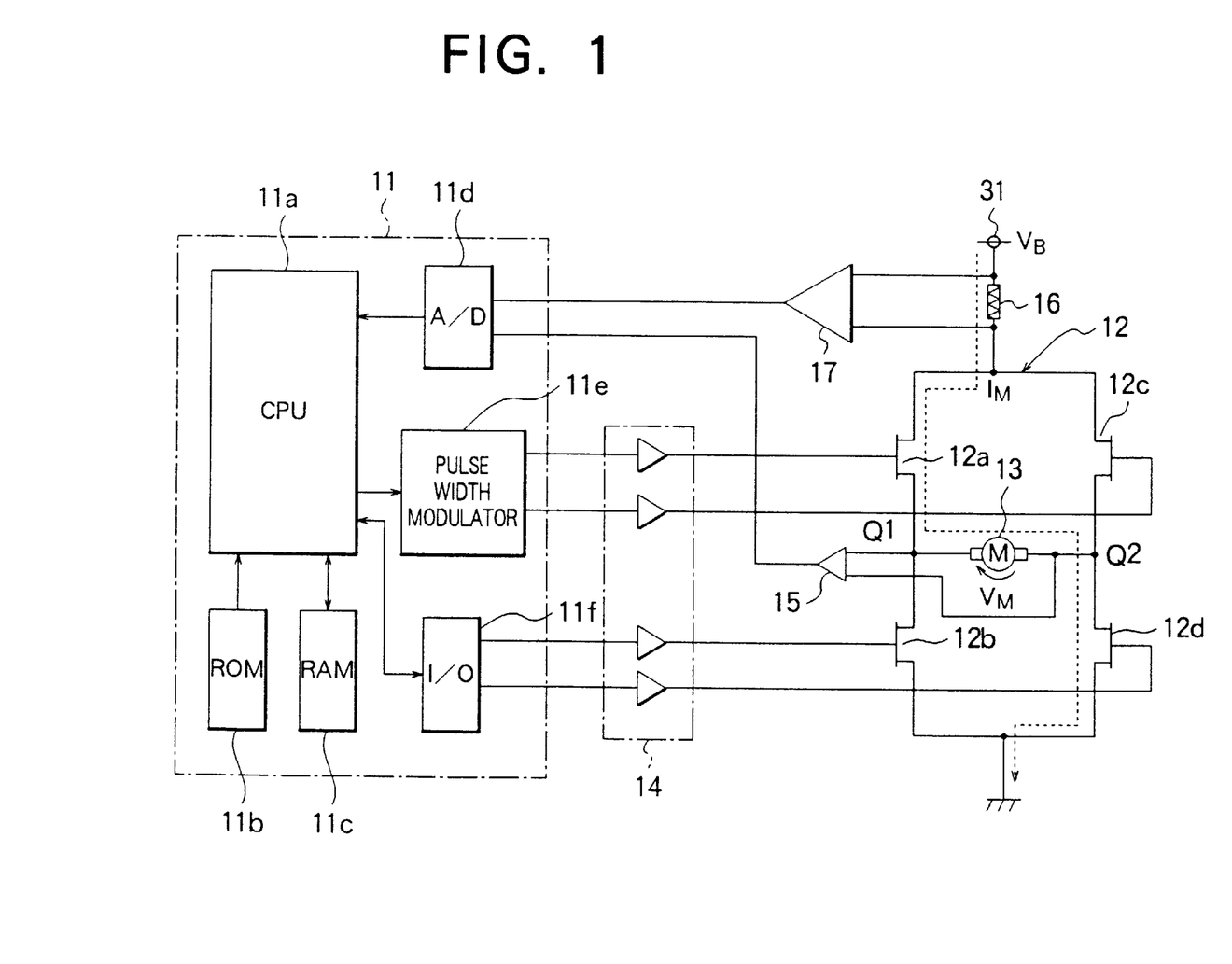
FIG. 1 is a circuit diagram partially in block form illustrating a DC motor controller according to one embodiment of the present invention.

FIG. 1 illustrates a DC motor controller according to an embodiment of the present invention.

Figure 3:
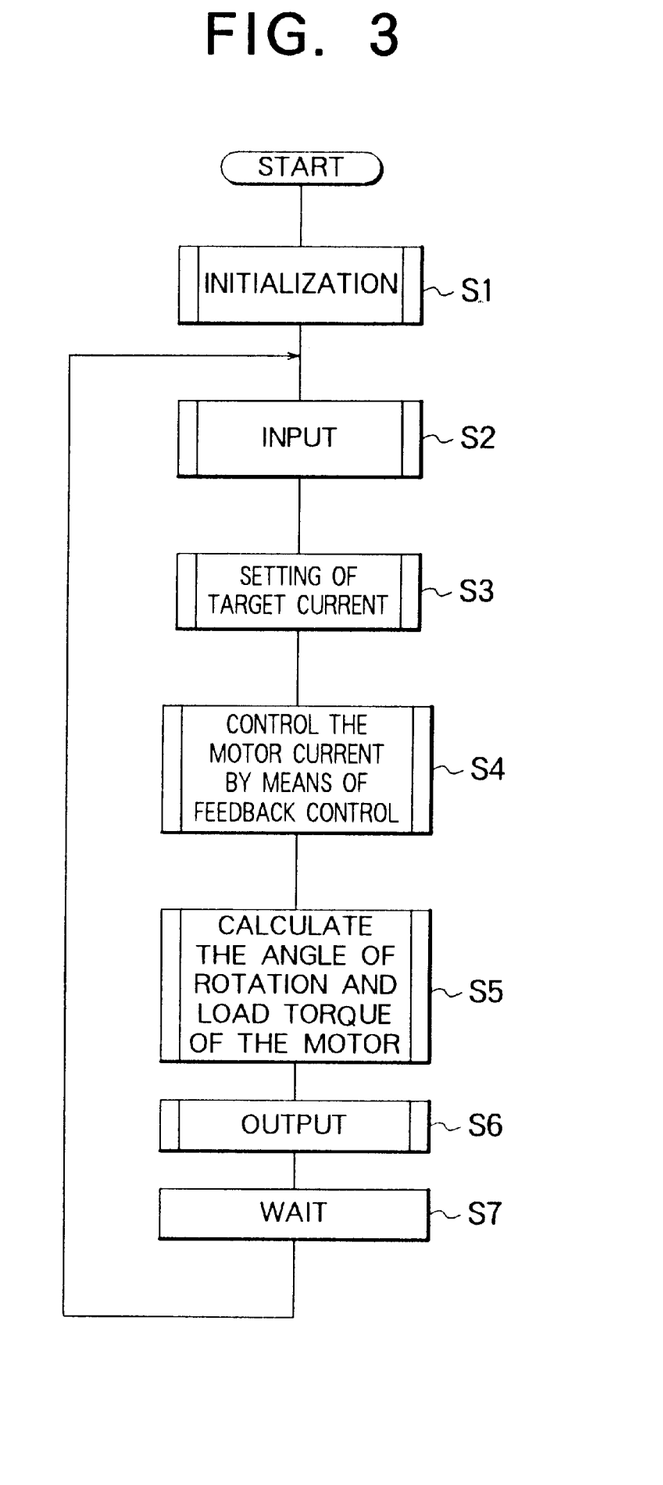
FIG. 3 is a flow chart illustrating the processes performed by the DC motor controller shown in FIG. 1.

As shown in FIG. 1, there is provided a microcomputer 11 including: a CPU 11a which performs various kinds of calculations and processes and serves as rotation angle calculation means and load torque calculation means; a ROM 11b in which a program such as that shown in FIG. 3 has been stored beforehand; a RAM 11c used by the CPU 11a to read and write information during the calculation processing; an analog-to-digital converter 11d for converting the armature current of the DC motor and the generated voltage into digital signals; a pulse width modulator 11e for modulating the pulse width of the control signal output from the CPU 11a and providing the resultant signal as a driving signal; and an input-output interface circuit 11f for outputting the control signal output from the CPU 11a as a driving signal.

Furthermore, there is provided an H-type bridge circuit 12 for driving the DC motor 13, wherein the H-type bridge circuit 12 includes power MOSFETs 12a–12d serving as switching devices.

In this bridge circuit, a series connection of FETs 12a and 12b is connected in parallel to a series connection of FETs 12c and 12d, the node Q1 between the FETs 12a and 12b is connected to a terminal of the DC motor 13, and the node Q2 between the FETs 12c and 12d is connected to the other end of the DC motor 13.

The node between the FETs 12a and 12c is connected via a resistor 16 used to detect an armature current to a power supply terminal 31 via which a DC voltage $V_B$ is supplied. The node between the FETs 12b and 12d is grounded.

The pulse-width-modulated driving signal output from the pulse width modulator 11e of the microcomputer 11 is supplied to the gates of the FETs 12a and 12c via a gate driving circuit 14. The driving signal output from the input-output interface circuit 11f is supplied to the gates of the FETs 12b and 12d via the gate driving circuit 14.

The generated voltage $V_M$ of the motor 13 obtained between the nodes Q1 and Q2 is supplied via an input interface circuit 15 to the analog-to-digital converter 11d, which converts the received voltage signal into a digital form and supplies the resultant digital signal to the CPU 11a.

On the other hand, the signal representing the armature current detected across the resistor 16 is supplied via an input interface circuit 17 to the analog-to-digital converter 11d, which converts the received signal into a digital form and supplies the resultant digital signal to the CPU 11a. In the above circuit, the resistor 16, the input interface circuit 17 and the analog-to-digital converter 11d constitute driving torque control means, and the input interface circuit 15 and the analog-to-digital converter 11d constitute generated-voltage detection means. The bridge circuit 12, the gate driving circuit 14, the pulse width modulator 11e and the input-output interface circuit 11f constitute DC motor driving means.

The operation of the DC motor controller shown in FIG. 1 will be described below with reference to FIGS. 2 and 3.

First, in an on-state, a motor current $I_M$ with a predetermined magnitude $I_1$ is passed along a path in a direction indicated by a broken-line arrow in FIG. 1 for a predetermined period of time $t_1$ (refer to FIG. 2).

Referring to the flow chart shown in FIG. 3, the above operation will be described in further detail below. In step S2, input processing is performed. That is, the motor current $I_M$ is detected via the resistor 16, and is applied to the CPU 11a via the input interface circuit 17 and the analog-to-digital converter 11d. Thus, the detected value of the motor current $I_M$ is input to the CPU 11a.

In step S4, the motor current $I_M$ is adjusted so that the motor current $I_M$ becomes equal to the target current $I_1$ which has been set in step S3. The above adjustment is performed using the feedback control technique and the duty ratio of the signal output from the pulse width modulator 11e is determined to a proper value.

Step S5, which will be described later, is skipped and the process goes to step S6 to perform an outputting process. That is, the FETs 12b and 12c are turned off and the FET 12a is driven in a PWM fashion. The FET 12d is turned on (and driven with a constant duty ratio) thereby controlling the magnitude and the direction of the current flowing through the DC motor 13. In the above operation, the FETs 12a and 12d may be driven either simultaneously or separately by a PWM driving signal.

The above operation is continued for a period of time $t_1$.

Then all the FETs 12a–12d are turned off so as to stop the supply of current to the DC motor 13, and the rotation angle $\theta_1$ is calculated from the voltage $V_1$ which is generated by the DC motor 13 after the supply of current to the DC motor has been stopped. This process will be described in further detail below with reference to the flow chart shown in FIG. 3.

In step S3, the target current $I_1$ is set to zero. As a result, all the FETs 12a–12d are turned off in step S6. In this state, the voltage $V_M$ between the nodes Q1 and Q2, is input to the CPU 11a via the input interface circuit 15 and the analog-to-digital converter 11d. The above voltage $V_M$ is read in the inputting process in step S2, and thus the generated voltage $V_1$ of the DC motor 13 or the back electromotive force which occurs when the DC motor 13 rotates by inertia is determined.

In the next processing cycle, the rotation angle $\theta_1$ of the DC motor 13 during a driven state is calculated in step S5 from the above generated voltage $V_1$ and the driving time period $t_1$, as will be described in further detail below.

The process in step S5 of calculating the rotation angle $\theta_1$ in the driven state performed as follows.

When a predetermined current $I_1$ is passed through the DC motor 13, if the associated with the friction of bearings of the DC motor 13 and other terms which are proportional to the velocity are neglected, the following equations (1) and (2) hold:

$$T - T_L = J \cdot d\omega/dt \tag{1}$$

$$T = k_T \cdot I_1 \tag{2}$$

$$\omega = d\theta/dt \tag{3}$$

where T denotes the motor driving torque, $T_L$ the load torque of DC motor 13, J the moment of inertia of the motor, $\omega$ the angular velocity of the motor, $K_T$ the torque constant of the motor, and $\theta$ the angle of rotation of the motor.

If it is assumed here that the load torque $T_L$ is constant and furthermore the initial velocity of the DC motor 13 is zero, then the angular velocity $\omega_1$ of the motor obtained when a predetermined period of time $t_1$ has elapsed can be determined from equations (1) ad (2) as represented by equation (4):

$$\omega_1 = t_1(k_T I_1 - T_L)/J \tag{4}$$

From equations (3) and (4), the rotation angle $\theta_1$ of the motor after the elapse of predetermined time $t_1$ is given by the following equation (5):

$$\theta_1 = t_1^2(k_T \cdot I_1 - T_L)/2J = \omega_1 t_1/2 \tag{5}$$

If it is assumed here that back electromotive force coefficient is given by $K_C$, then the following equation (6) in terms of the voltage $V_M$ generated by the motor is obtained:

$$\omega_1 = V_1/K_C \tag{6}$$

Substituting equation (6) into equation (5) gives:

$$\theta_1 = V_1 t_1/2K_C \tag{7}$$

Since $K_C$ on the right-hand side of equation (7) is a constant, if $t_1$ and $V_1$ are given then the rotation angle $\theta_1$ in the driven state can be determined.

Now the method of calculating the rotation angle $\theta_2$ in the non-driven state in step S5 will be described below. The angle of rotation $\theta_2$ which occurs during a period of time $t_2$ after stopping the supply of current to the motor is given from equation (3) as:

$$\theta_2 = \int_{t_1}^{t_2} \omega \, dt \tag{8}$$

Thus, if the angular velocities $\omega_{n2}$ measured at sampling time intervals of $\Delta t_2$ are given, then the angle of rotation $\theta_2$ is given by the following equation (9):

$$\theta_2 = \omega_{12} + \omega_{22} + \omega_{32} + \ldots + \omega_{n2} \tag{9}$$

If equation (6) is substituted into equation (9), then equation (9) becomes:

$$\omega_2 = (V_{12} + V_{22} + V_{32} + \ldots + V_{n2})/K_C \tag{10}$$

Since $K_C$ on the right-hand side of equation (10) is a constant, if $\Delta_{t2}$ and $V_{n2}$ are given then the rotation angle of the motor in the non-driven state can be determined.

That is, the rotation angle $\theta_2$ is given by the sum of the products of the coefficient $1/K_C$ and the generated voltages $V_M$ of the motor measured at intervals of $\Delta_{t2}$.

The overall rotation angle from the start of supplying the driving current until the time $t_2$ after stopping the supply of the driving current is given as the sum of $\theta_1$ and $\theta_2$.

From the rotation angle $\theta_1$ of the motor, the load torque can be calculated as follows.

Equation (5) described above can be rewritten in terms of $T_L$ into the following form:

$$T_L = k_T \cdot I_1 - 2J \cdot \theta_1 \cdot 1 t_1^2 \tag{11}$$

Since $K_T$ and J in equation in (11) are a constant, if $I_1$, $t_1$, and $\theta_1$ are given then the load torque $T_L$ can be determined. If the load torque $T_L$ becomes excessive or $K_T$ is decreased (shorted), it can be detected as a decrease of $\theta_1$.

That is, if the driving current $I_1$ supplied to the DC motor 13 and the driving time period $t_1$ are selected so that no inconsistency occurs even when abnormal deviation occurs in the load torque, then the voltage $V_2$, which is generated by the motor when the predetermined time $t_2$ has been elapsed after stopping the supply of the current to the motor, decreases with the increasing load torque $T_L$ as shown in FIG. 2. Thus, the rotation angle $\theta_1$ of the motor and the load torque $T_L$ can be determined as shown in FIG. 2.

Referring again to the flow chart in FIG. 3, step S1 is an initialization step in which the peripheral devices such as the analog-to-digital converter 11d are initialized, and step S7 is a waiting step in which a proper waiting time is provided so that the elapsed times $t_1$ and $t_2$ may be measured correctly and thus the series of the above-described processing steps may be repeated correctly at predetermined time intervals.

In the present embodiment, as described above, the DC motor controller can accurately determine the angle of rotation and the load torque of the DC motor 13 from the voltage generated by the DC motor 13 without using an angular velocity detector such as a tachometer generator. If the series of the processing steps described above is performed at least once after starting the motor controller, that is, only if the DC motor 13 is turned on for a short time without continuously maintaining the DC motor 13 in an on-state for a long time, it is possible to detect a serious failure in the DC motor 13 before the failure leads to locking in the operation. In the event of such a failure, fail-safe processing will be performed. As a result, the reliability is greatly improved. Furthermore, the technique of the present embodiment makes it possible to control the DC motor 13 in accordance with the load torque $T_L$.

EMBODIMENT 2

Figure 4:
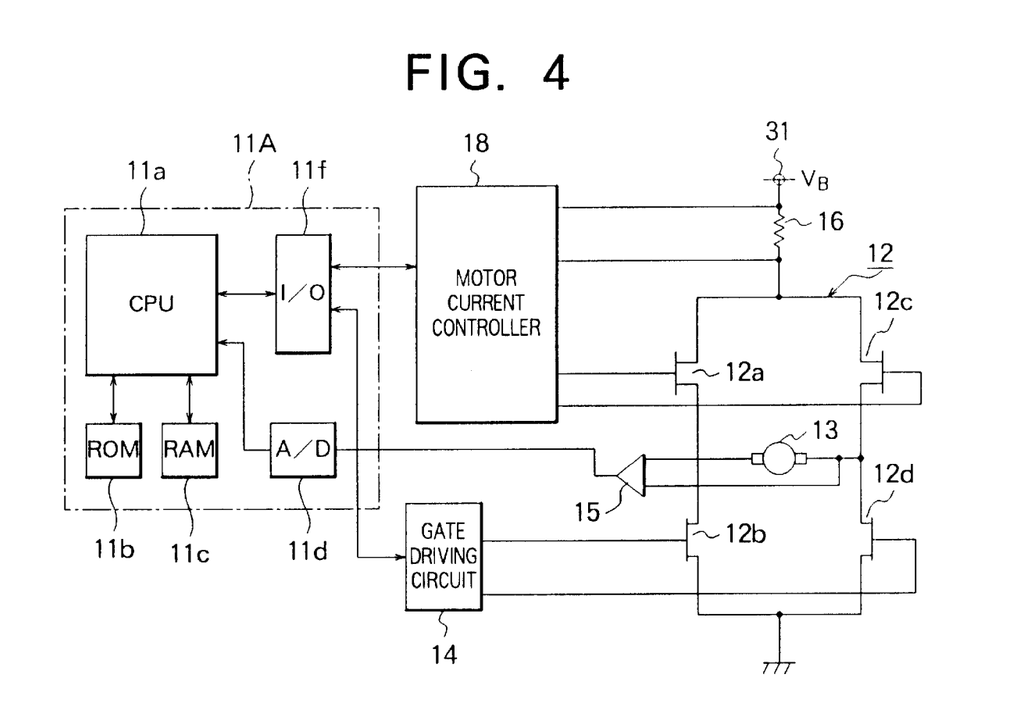
FIG. 4 is a circuit diagram partially in block form illustrating a DC motor controller according to another embodiment of the present invention.

FIG. 4 illustrates a DC motor controller according to a second embodiment of the present invention. In FIG. 4, equivalent or similar parts to those in FIG. 1 are denoted by similar reference numerals, and will not be described here in further detail. In the specific embodiment described above with reference to FIG. 1, the motor current $I_M$ is controlled substantially by means of software. Instead, in this second embodiment, there is provided a motor current control means 18 whereby the motor current $I_M$ is controlled by means of hardware. Therefore, the microcomputer 11a used in this embodiment no longer has a pulse width modulator 11e such as that employed in the microcomputer 11 of the first embodiment. Instead, the pulse width modulator is incorporated in the motor current control means 13. The other parts are similar to those shown in FIG. 1.

Figure 5:
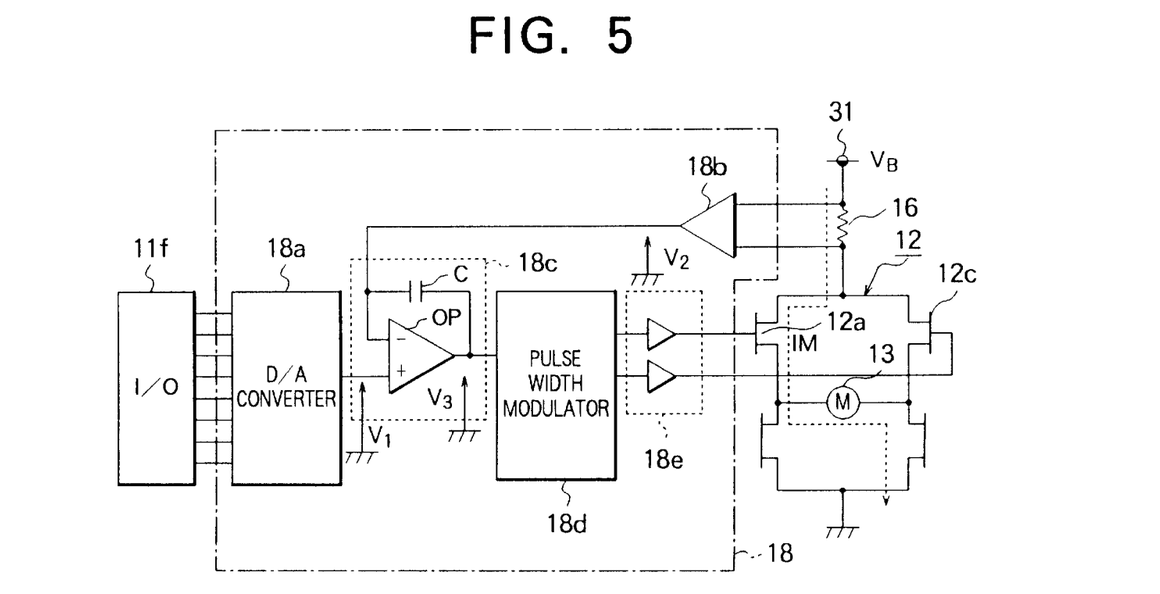
FIG. 5 is a circuit diagram partially in block form illustrating a specific example of the circuit configuration of the motor current control means shown in FIG. 4.

FIG. 5 illustrates a specific circuit implementing the motor current control means 18.

As shown in FIG. 5, the motor current control means 18 includes: a digital-to-analog converter 18a by which the target current to be passed through the motor, which is set by a CPU 11a via an input-output interface circuit 11f, is converted into an analog voltage $V_1$; a motor current detector 18b which converts the motor current $IM$ into a voltage $V_2$; a motor current control circuit 18c which includes for example an operational amplifier OP and a capacitor C and which controls the output voltage $V_3$ so that the voltage $V_2$ becomes equal to the voltage $V_1$; a pulse width modulator 18d which converts, by means of comparison of triangular waveforms, the output voltage $V_3$ of the motor current control circuit 18c into a pulse signal with a predetermined duty ratio; and a gate driving circuit 18e which receives the pulse signal from the pulse width modulator 18d and supplies a driving signal corresponding to the received pulse signal to the FETs 12a and 12c.

With the motor current control means 18 having the above construction, the FETs 12a and 12c are driven by means of the PWM technique so that the current actually passing through the DC motor 13 becomes equal to the target current set by the CPU 11a.

Thus the present embodiment not only has the advantage, as the first embodiment described above with reference to FIG. 1, that it is possible to accurately detect the rotation angle and the load torque $T_L$ but also has the advantage that the microcomputer 11A no longer has to perform step S4 by means of software. This allows a reduction in the amount of processes performed by the microcomputer 11A. Therefore, the microcomputer 11A may be of a less expensive type.

EMBODIMENT 3

In the first embodiment described above, the driving current $I_1$ and driving time period $t_1$ can be set to arbitrary values without particular limitations. However, if these values are set so that an rotation angle $\theta$ equal to or greater than for example 360° is obtained in the rotation of the DC motor 13 or in the rotation of a reduction gear connected to the DC motor 13 even when the load torque $T_L$ becomes smaller than a predetermined value, then it becomes possible to more surely detect an increase in the load torque $T_L$ due to for example incorporation of a foreign substance into the gear or motor system.

In this embodiment, as described above, when the load torque $T_L$ is smaller than the predetermined value, the rotation angle of the DC motor 13 or the rotation angle of the reduction gear connected to the DC motor 13 becomes greater than the predetermined value. This makes it possible to more surely detect an increase in the load torque due to for example incorporation of a foreign substance.

EMBODIMENT 4

Figure 6:
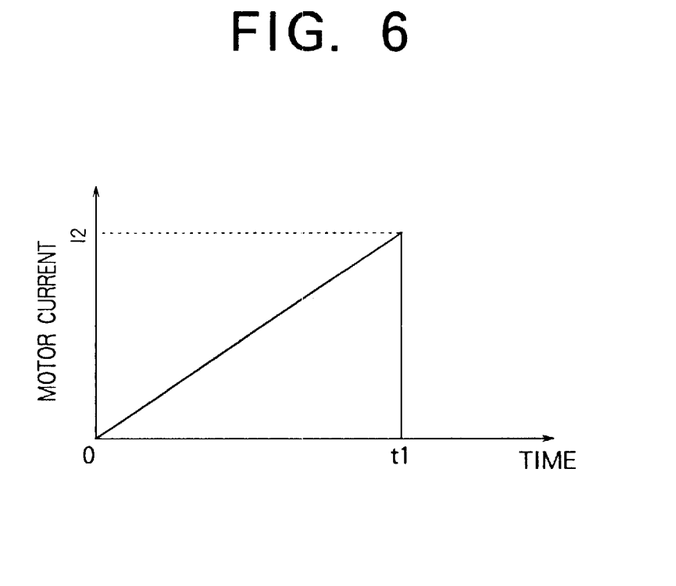
FIG. 6 is a schematic representation of another method of supplying a current to a motor.

In the previous embodiments, the driving current $I_1$ is set to a constant value. Instead, the driving current $I_1$ may be varied with time. For example, the driving current $I_1$ may be varied in accordance with a ramp function as shown in FIG. 6. In this case, equations (5) and (11) are modified into equations (12) and (13), respectively, as represented below:

$$\theta_1 = t_1^2(k_T I_2 - T_L)/2J = \omega_1 t_1/2 \quad (12)$$

$$T_L = k_T I_2 - 2J\theta_1 \cdot 1/t_1^2 \quad (13)$$

where $I_2$ is a current value when a last driving is performed.

In the case where the driving current $I_1$ is set to a constant value, the target value of the motor current $I_M$ changes in a step fashion, and thus overshooting can occur in the current depending on the setting of the driving current and the driving time, and also on the design of the current control system (feedback control system). The overshoot can produce an error in the detected torque. In the present embodiment, as opposed to the previous embodiments, the target current of the motor is changed at a small rate with time, that is, the motor current is gradually increased toward the final value for a period of time $t_1$ by means of feedback control so that no overshoot occurs without producing the problems which can occur in the previous embodiments.

In the present embodiment, as described above, the target current of the motor is changed at a small rate with time thereby preventing the error in the detection of torque due to overshoot of current.

EMBODIMENT 5

In the previous embodiments, when the voltage generated by the DC motor 13 is measured, all the FETs 12a–12d are turned off. However, the voltage generated by the DC motor 13 may also be detected in a state in which only the two FETs 12b and 12d on the ground side are turned off.

For example, after passing a motor current $I_M$ through the motor 13 in a driven state, the FET 12a is turned off while maintaining the FETs 12*b* and 12*c* in the off-states and the FET 12*d* in the on-state. In this state, if the voltage $V_M$ shown in FIG. 1 is measured, then the resulting positive voltage $V_M$ with respect to the ground voltage gives the voltage generated by the DC motor 13.

In the previous embodiments, the interface circuit 15 is required to include a differential amplifier (not shown) to detect the differential voltage between the two terminals of the DC motor 13 in the state in which the FET 12*d* is turned off. In the present embodiment, in contrast, since one terminal of the DC motor 13 is grounded via the FET 12*d*, the generated voltage can be detected only by measuring the voltage at the terminal of the DC motor 13 opposite to the terminal connected to the FET 12*d* with respect to the ground voltage. Therefore, the present embodiment no longer needs the differential amplifier. This allows simplification in the construction of the input interface circuit 15.

Furthermore, in the previous embodiments, since the voltage between the two terminals of the DC motor 13 is measured in the state in which the FET 12*d* is turned off, the measurable voltage range is half the reference voltage of the analog-to-digital converter 11*d*. For example, when the reference voltage of the analog-to-digital converter 11*d* is 5 V, then the measurable voltage range is as narrow as from 0 to 2.5 V. In the present embodiment, on the other hand, since the FET 12*d* is turned on and the voltage is measured relative to the ground voltage, the full range from 0 to 5 V can be utilized in the measurement and thus the voltage generated by the DC motor 13 can be measured with correspondingly higher resolution.

EMBODIMENT 6

Figure 7:
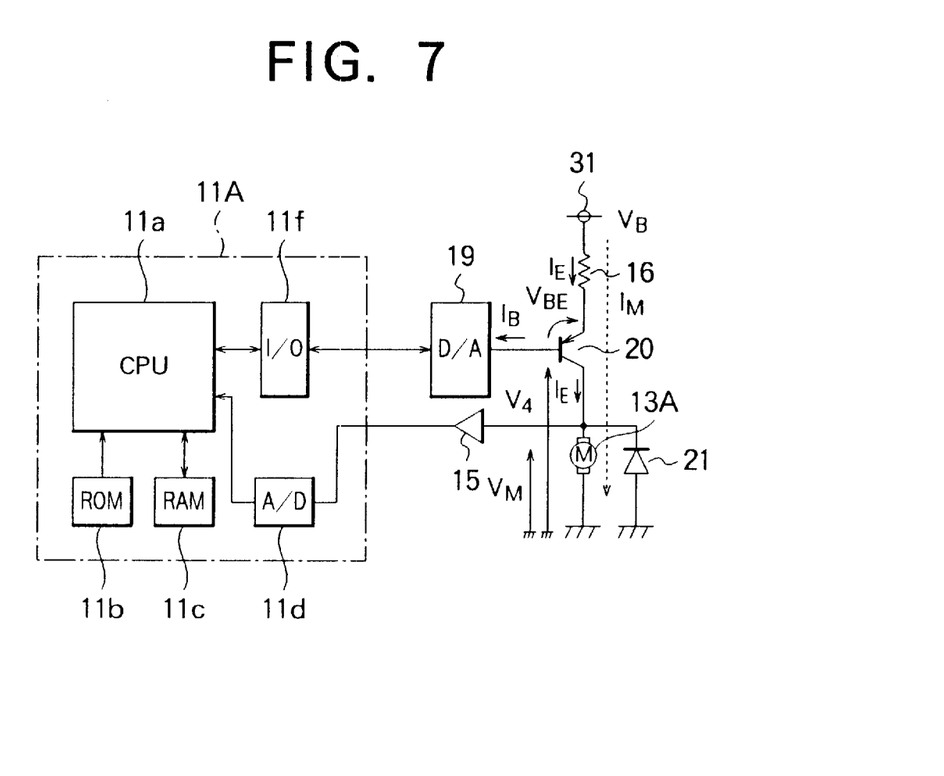
FIG. 7 is a circuit diagram partially in block form illustrating a DC motor controller according to still another embodiment of the present invention.

FIG. 7 illustrates a DC motor controller according to a sixth embodiment of the present invention. In this sixth embodiment, as opposed to the previous embodiments in which the DC motor 13 can be driven in either forward or reverse direction, the DC motor 13 can be driven only in one direction. In FIG. 7, equivalent or similar parts to those in FIG. 1 are denoted by similar reference numerals, and they are not described here in further detail.

In this embodiment, as shown in FIG. 7, one end of a DC motor 13 is grounded while the other end is connected to a power supply terminal 31 via a series connection of a switching device such as a PNP transistor 20 and a resistor 16 used to detect the armature current wherein PNP transistor 20 is connected so that the current flows between its collector and emitter. The base of the transistor 20 is connected to motor current setting means realized by for example a digital-to-analog converter 19 so that a driving signal is supplied from the digital-to-analog converter 19 to the transistor 20.

A flywheel diode 21 is connected in parallel to the DC motor 13. The voltage obtained at the node between the DC motor 13 and the collector of the transistor 20 is supplied to an analog-to-digital converter 11*d* via an input interface circuit 15. The analog-to-digital converter 11*d* converts the received signal into a digital signal, and supplies the resultant digital signal to a CPU 11*a*.

Now the operation will be described below.

First, the CPU 11*a* sets a target current, and supplies a voltage $V_4$ corresponding to the target current to the base of the transistor 20 via an interface circuit 11*f* and the digital-to-analog converter 19. If the transistor 20 has a sufficiently high current gain by means of for example the Darlington connection, and the base current $I_B$ is negligibly small compared to the emitter current $I_E$ and the collector current $I_C$, then the motor current $I_M$ flowing through the DC motor 13 can be written as:

$$I_M = I_C \approx I_E (V_B - V_{BE} - V_4)/R_E \qquad (14)$$

where $V_{BE}$ is the base-emitter voltage of the transistor 20, and $R_E$ is the resistance of the resistor 16. Therefore, if the power supply voltage $V_B$, the base-emitter voltage $V_{BE}$, and the resistance $R_E$ are all constant, then the DC motor 13 is driven by a constant current which can be controlled by the voltage $V_4$. In this embodiment, since one end of the DC motor 13 is grounded, if the positive voltage $V_M$ relative to the ground voltage is measured after stopping the supply of the current to the DC motor, then the resulting voltage gives the voltage $V_2$ generated by the DC motor 13.

Thus in this embodiment the rotation angle θ and the load torque of the DC motor 13 can be calculated from the generated voltage $V_2$ and the elapsed time after the supply of current is stopped, according to the process shown in the flow chart of FIG. 3 (step S4 is skipped in this embodiment).

Thus in the present embodiment, it is possible to accurately detect the rotation angle θ and the load torque $T_L$ even in the case where the DC motor 13 is driven in a single direction. Furthermore, the microcomputer 11A no longer has to perform step S4 shown in FIG. 3, and thus the microcomputer 11A may be of an inexpensive type. Still furthermore, since the voltage is measured with respect to the ground voltage, the generated voltage of the DC motor 13 can be measured with higher resolution.

EMBODIMENT 7

Figure 8:
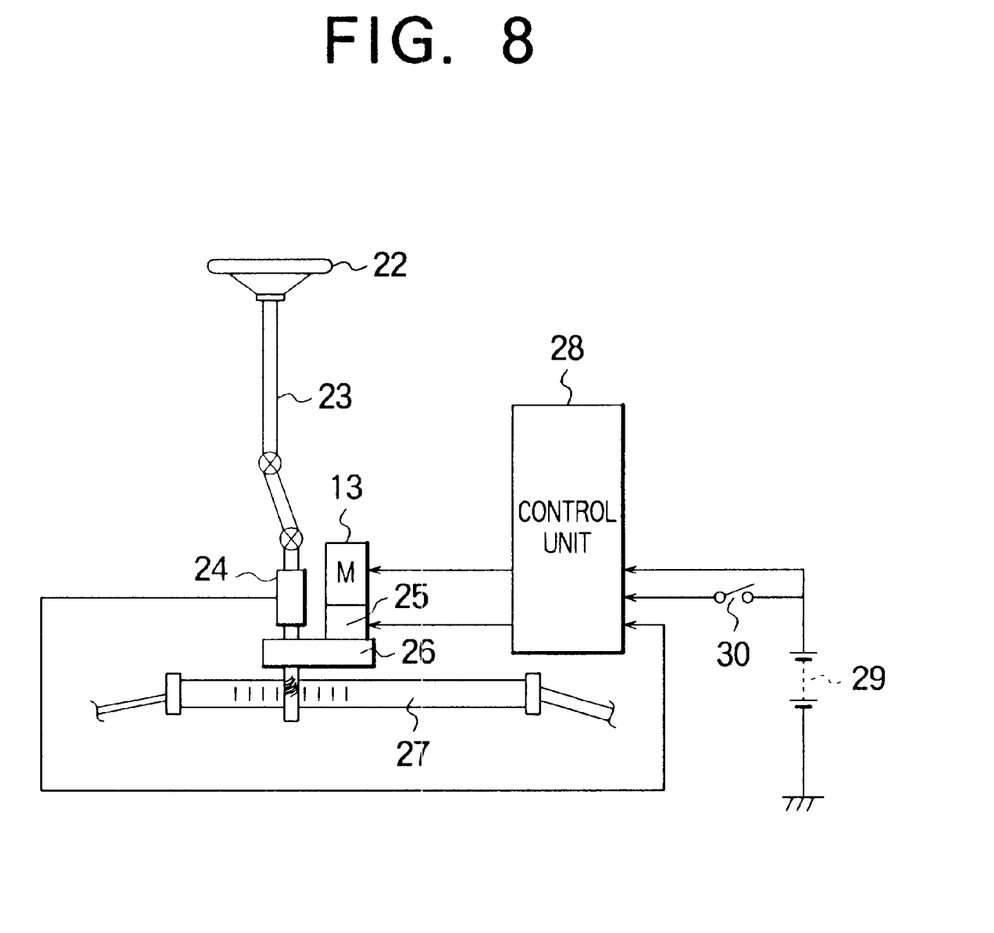
FIG. 8 is schematic diagram illustrating the construction of an electric motor-driven power steering system according to another embodiment of the present invention.

FIG. 8 is a schematic diagram illustrating the construction of an electric motor-driven power steering system for use in a car or the like, including a DC motor controller according to any of the previous embodiments. In FIG. 8, similar parts to those in FIG. 1 are denoted by similar reference numerals. As shown in FIG. 8, the electric motor-driven power steering system includes: a steering wheel 22; a steering shaft 23 connected to the steering wheel 22; a torque sensor 24 for measuring the torque of the steering shaft 23; a clutch 25 for mechanically connecting or isolating a DC motor to or from the steering shaft 23 via a reduction gear 26; a latch shaft 27 for connecting the steering shaft 23 to wheels; a control unit 28 for controlling the DC motor 13 and the clutch 25 on the basis of the signals output from the torque sensor 24 and other elements. In this system, the control unit 28 corresponds to the DC motor controller in the previous embodiments.

The electric motor-driven power steering system further includes a battery 29 for supplying electric power to the control unit 28 and other elements, and an ignition switch 30 disposed between the battery 29 and the control unit 28. Although the electric motor-driven power steering system also includes clutch control means for controlling the operation of connecting and isolating the clutch 25, it is not shown in FIG. 8.

Referring to the flow chart shown in FIG. 9, the operation of the control unit 28 will be described below.

If the ignition switch 30 is turned on, initialization associated with the control unit 28 is performed in step S11. In the next step S12, the clutch 25 is turned off thereby mechanically isolating the DC motor 13 from the steering shaft 23. Then in step S13, the rotation angle θ and the load torque $T_L$ of the DC motor 13 are detected and checked as described above.

When the DC motor 13 is mechanically isolated from the steering shaft 23, if the angle of rotation does not reach the predetermined threshold angle, or if the load torque $T_L$ is found to be abnormal, then the process goes to step S16 in which the fail-safe processing is performed so that the turning-on of the clutch and the supply of current to the DC motor 13 are prohibited in the following operation.

In the case where no abnormality is detected in step S13, the process goes to step S14 in which the clutch 25 is turned on thereby mechanically connecting the DC motor 13 to the steering shaft 23. Then in step S15, the power steering operation is controlled on the basis of the signals output from the torque sensor 24 or other elements.

In the present embodiment, as described above, it is possible to surely detect a failure which will lead to locking in the steering wheel by measuring the rotation angle θ or the load torque $T_L$ at least once after starting the control unit 28 of the power steering system. Thus, the present embodiment provides high reliability in the power steering system.

EMBODIMENT 8

Although in the embodiment described above with reference to FIG. 8 the clutch 25 is located between the DC motor 13 and the reduction gear 26, the clutch 25 may be located anywhere as long as the location allows the clutch 25 to mechanically connect and isolate the DC motor 13 to and from the steering shaft 23.

For example, if the clutch 25 is disposed between the reduction gear 26 and the steering shaft 23, it will also be possible to detect a failure due to incorporation of a foreign substance into the reduction gear system.

In the specific example shown in FIG. 8, only the torque sensor is provided as means of detecting the conditions of the car. Other means of detecting the car speed, the angle of the steering wheel, or other conditions of the car may also be provided. This will provide the user or the driver of the car with the ability to more comfortably steering the car. More specifically, a pulse generator may be provided and the repetition period of the pulse generated by the pulse generator may be detected by the CPU thereby detecting the car speed. A potentiometer may also be provided so that the CPU can determine the angle of the steering wheel from the output of the potentiometer.

Furthermore, there may also be provided an alarming device such as a buzzer or a lamp to notify the driver of an event of a failure. In the event of such a failure, the alarming device is driven in the fail-safe processing in step S16 shown in FIG. 9.

EMBODIMENT 9

Figure 9:
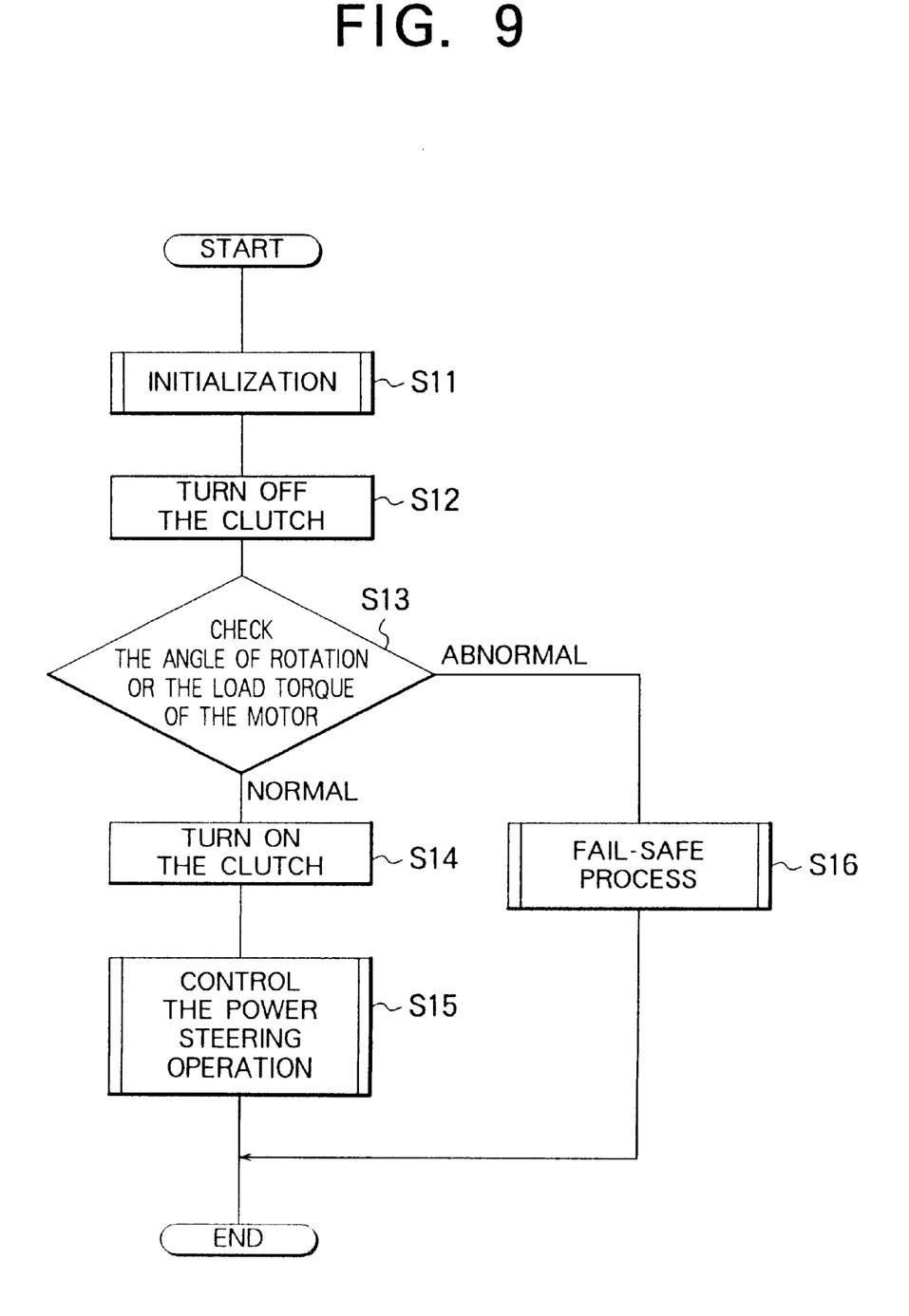
FIG. 9 is a flow chart illustrating the operation of the control unit shown in FIG. 8.

In this ninth embodiment, it is checked whether the clutch 25 is in an off-state and the car speed is sufficiently low before performing the detection of the rotation angle θ and the load torque $T_L$ of the motor 13 in step S13 of the flow chart shown in FIG. 9. If and only if the above check has been passed successfully and thus it has been found that the DC motor 13 can be turned on without any safety risk, the process goes to step S13 to detect the rotation angle θ and the load torque $T_L$ of the motor.

This prevents the possibility that when a failure has occurred and the clutch 25 is locked in the on-state due to the failure, the wheels are steered as a result of the operation of detecting the rotation angle θ and the load torque $T_L$. Even if the wheels are steered, as car speed is low, the influence exercised to on the behavior of a vehicle is small, thus, sufficient safety can be achieved. Thus, the present embodiment provides higher reliability in the power steering system.

EMBODIMENT 10

In the flow chart shown in FIG. 9, the rotation angle and the load torque $T_L$ of the DC motor 13 are checked only once after starting the control unit 28. Instead, in this tenth embodiment, the rotation angle and the load torque $T_L$ of the DC motor 13 are checked a plurality of times when the clutch 25 is in an off-state.

For example, the rotation angle and the load torque $T_L$ of the DC motor 13 may be checked when a car stops at a stopping signal. This makes the system more reliable in detection of a failure associated with the DC motor 13.

Although in the flow chart shown in FIG. 9 the rotation angle θ and the load torque $T_L$ of the DC motor 13 are checked in step S13 after turning off the clutch 25 in step S12, the rotation angle θ and the load torque $T_L$ of the DC motor 13 may also be checked while maintaining the clutch 25 in the on-state in the case where the reduction gear 26 has a sufficiently high reduction ratio and thus no significant change occurs in the steering angle of the wheels when the DC motor 13 is driven to detect the rotation angle θ or the load torque $T_L$.

If the rotation angle θ and the load torque $T_L$ of the DC motor 13 are checked while maintaining the clutch 25 in the on-state, it becomes possible to detect an increase in the load torque due to incorporation of foreign substance into the reduction gear system or the clutch system.

EMBODIMENT 11

In the above embodiment, it is assumed that a DC motor with brushes is employed. Instead, a brushless type DC motor may also be employed in the present invention. The rotation angle or the load torque of the motor may be detected in a similar manner also in this case. A DC motor may be employed various types of motor, for example, a series motor a compound motor.

Furthermore, although the invention is applied to a car steering system in the previous embodiments, the invention may also be applied to other types of mobile bodies such as a two-wheeled vehicle, ship, etc.

What is claimed is:

1. A method of detecting the angle of rotation of a DC motor for driving a predetermined load, said method comprising the steps of:

driving said DC motor with a predetermined driving torque for a predetermined driving time period; and calculating the angle of rotation of said DC motor which occurs when the DC motor is driven based on the product of the driving time period and the voltage generated by said DC motor after the driving of said DC motor is stopped.

2. A method of detecting the angle of rotation of a DC motor, according to claim 1, wherein said predetermined load is a steering system of a mobile body and said steering system is connected to the DC motor through a clutch to be steered or provided auxiliary actuation during a steering operation.

3. A method of detecting the angle of rotation of a DC motor, according to claim 2, wherein said mobile body is a vehicle including a clutch control command device for controlling the connection of said clutch to said steering device on the basis of said angle of rotation of said DC motor calculated by a rotation angle calculation device.

4. A method of detecting the angle of rotation of a DC motor, according to claim 1, wherein said predetermined driving torque is generated by supplying a current which increases in proportion to time to said DC motor.

5. A method of detecting the angle of rotation of a DC motor, according to claim 1, further comprising the step of calculating the angle of rotation of said DC motor which occurs when said DC motor is driven, on the basis of the voltage generated by said DC motor immediately after said DC motor is driven.

6. A method of detecting the angle of rotation of a DC motor, according to claim 1, further comprising the step of calculating the angle of rotation of said DC motor which occurs when said DC motor is not driven, on the basis of an integral value obtained by integrating the voltages generated by said DC motor after the driving of said DC motor is stopped.

7. A method of detecting the angle of rotation of a DC motor, according to claim 1, further comprising the steps of:
 calculating the angle of rotation of said DC motor which occurs when said DC motor is driven, on the basis of the voltage generated by said DC motor immediately after said DC motor is driven;
 calculating the angle of rotation of said DC motor which occurs when said DC motor is not driven, on the basis of an integral value obtained by integrating the voltages generated by said DC motor after the driving of said DC motor is stopped; and
 calculating the sum of said angle of rotation which occurs when said DC motor is driven and said angle of rotation which occurs when said DC motor is not driven, thereby calculating the overall angle of rotation including the angle of rotation which occurs when said DC motor is driven and that which occurs when said DC motor is not driven.

8. A method of detecting the angle of rotation of a DC motor, according to claim 1, wherein said driving torque and said driving time period are set to a value equal to or greater than a predetermined value, respectively, so that said DC motor rotates by an amount at least equal to or greater than a predetermined angle when the load torque of said DC motor is a predetermined value.

9. A method of detecting the load torque of a DC motor, said method comprising the steps of:
 driving said DC motor with a predetermined driving torque for a predetermined driving time period; and
 calculating the angle of rotation of said DC motor which occurs when the DC motor is driven based on the product of the driving time period and the voltage generated by said DC motor after the driving of said DC motor is stopped; and
 calculating the load torque of said DC motor from said angle of rotation of said DC motor.

10. An apparatus for detecting the angle of rotation of a DC motor for driving a predetermined load, said apparatus comprising:
 a driving torque control device for driving said DC motor with a predetermined driving torque for a predetermined driving time period;
 a generated-voltage detection device for detecting the voltage generated by said DC motor after the driving of said DC motor is stopped; and
 a rotation angle calculation device for calculating the angle of rotation of said DC motor which occurs when the DC motor is driven based on the product of the driving time period and said voltage generated by said DC motor after the driving of the DC motor is stopped.

11. An apparatus for detecting the angle of rotation of the DC motor, according to claim 10, wherein said predetermined load is a steering system of a mobile body and said steering system is connected to the DC motor through a clutch to be steered or provided auxiliary actuation during a steering operation.

12. An apparatus for detecting the angle of rotation of the DC motor, according to claim 11, wherein said mobile body is a vehicle including a clutch control command device for controlling the connection of said clutch to said steering device on the basis of said angle of rotation of said DC motor calculated by a rotation angle calculation device.

13. An apparatus for detecting the angle of rotation of the DC motor, according to claim 10, wherein said driving torque control device generates a predetermined driving torque by supplying a current which increases in proportion to time to said DC motor.

14. An apparatus for detecting the angle of rotation of the DC motor, according to claim 10, wherein said rotation angle calculation device calculates the angle of rotation of said DC motor which occurs when said DC motor is driven, on the basis of the voltage generated by said DC motor immediately after said DC motor is driven.

15. An apparatus for detecting the angle of rotation of the DC motor, according to claim 10, wherein said rotation angle calculation device calculates the angle of rotation of said DC motor which occurs when said DC motor is not driven, on the basis of an integral value obtained by integrating the voltages generated by said DC motor after the driving of said DC motor is stopped.

16. An apparatus for detecting the angle of rotation of the DC motor, according to claim 10, wherein said rotation angle calculation device calculates the angle of rotation of said DC motor which occurs when said DC motor is driven, on the basis of the voltage generated by said DC motor immediately after said DC motor is driven, and calculates the angle of rotation of said DC motor which occurs when said DC motor is not driven, on the basis of an integral value obtained by integrating the voltages generated by said DC motor after the driving of said DC motor is stopped, and calculates the sum of said angle of rotation which occurs when said DC motor is driven and said angle of rotation which occurs when said DC motor is not driven, thereby calculating the overall angle of rotation including the angle of rotation which occurs when said DC motor is driven and that which occurs when said DC motor is not driven.

17. An apparatus for detecting the angle of rotation of the DC motor, according to claim 10, wherein the driving torque and the driving time period of said driving torque control device is set to a value equal to or greater than a predetermined value, respectively, so that said DC motor rotates by an amount equal to or greater than a predetermined angle when the load torque of said DC motor is a predetermined value.

18. An apparatus for detecting the angle of rotation of the DC motor, according to claim 10, further comprising a DC motor driving device, wherein said DC motor driving device includes an earthing device for connecting one of terminals of an armature of said DC motor to ground, and when said DC motor is not driven, said armature of the DC motors is connected to ground by said earthing device, wherein said generated-voltage detection device detects the voltage generated by said DC motor with respect to the ground voltage.

19. An apparatus for detecting the angle of rotation of the DC motor, according to claim 18, wherein said DC motor driving device includes a bridge circuit consisting of a plurality of switching devices provided between a DC power supply and said DC motor, for controlling said DC motor to either forward or reverse direction, and one terminal of said DC motor is connected to ground, wherein when said DC motor is not driven, a switching device located on the ground side of said DC power supply is turned on to function as the earthing device.

20. An apparatus for detecting the angle of rotation of the DC motor, according to claim 10, further comprising an alarming device for generating an alarm, when the angle of rotation of said DC motor calculated by said rotation angle calculation device is less than a predetermined value.

21. An apparatus for detecting the load torque of a DC motor according to claim 10, said apparatus further comprising a load torque calculation device for calculating the load torque of said DC motor from the angle of rotation of said DC motor.

* * * * *

UNITED STATES PATENT AND TRADEMARK OFFICE
CERTIFICATE OF CORRECTION

PATENT NO.   : 6,016,042                                    Page 1 of 1
DATED        : January 18, 2000
INVENTOR(S)  : Kazunori Miura, Takagi, Masanori, Kifuku, Takayuki, Ohtagaki, Shigeki

It is certified that error appears in the above-identified patent and that said Letters Patent is hereby corrected as shown below:

Column 1,
Between [73] and [21] insert -- [*] Notice:   This patent issued on a continued prosecution application filed under 37 CFR 1.53(d), and is subject to the twenty year patent term provisions of 35 U.S.C. § 1.54(a)(2).

Signed and Sealed this

Twenty-eighth Day of August, 2001

Attest:

NICHOLAS P. GODICI
Attesting Officer    Acting Director of the United States Patent and Trademark Office

UNITED STATES PATENT AND TRADEMARK OFFICE
CERTIFICATE OF CORRECTION

PATENT NO.    : 6,016,042                                    Page 1 of 1
DATED         : January 18, 2000
INVENTOR(S)   : Kazunori Miura, Takagi, Masanori, Kifuku, Takayuki, Ohtagaki, Shigeki It is certified that error appears in the above-identified patent and that said Letters Patent is hereby corrected as shown below:

<u>Title page,</u>
Between Item [73] and [21], insert -- [*] Notice: This patent issued on a continued prosecution application filed under 37 CFR 1.53(d), and is subject to the twenty year patent term provisions of 35 U.S.C. § 1.54(a)(2).

<u>Page 13,</u>
Line 5, delete "Fig. 2 is" and insert -- Figs. 2A-2D show --.

Figure 2A:
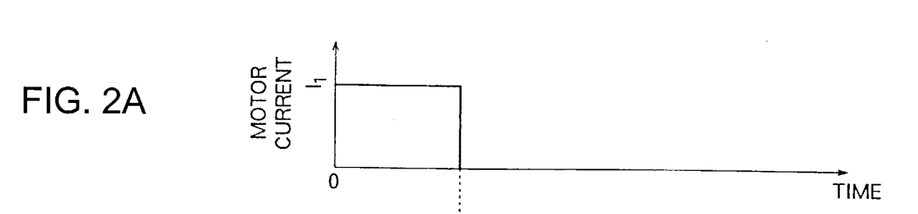
FIG. 2 is a schematic representation of the operation of the DC motor controller shown in FIG. 1.
Figure 2B:
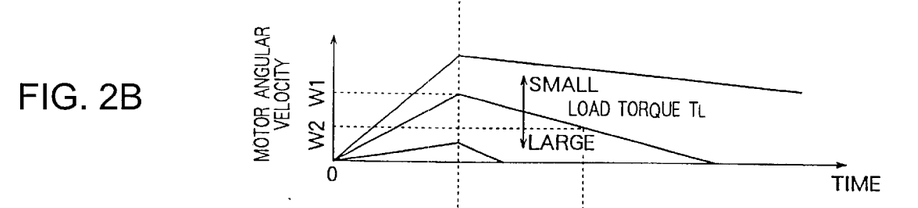

<u>Page 16,</u>
Line 9, delete "Fig. 2" and insert -- Fig. 2A --.

Figure 2C:
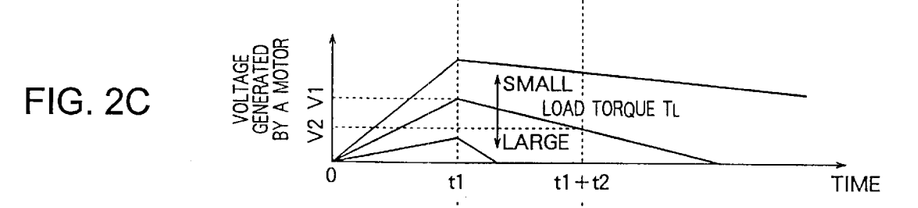
Figure 2D:
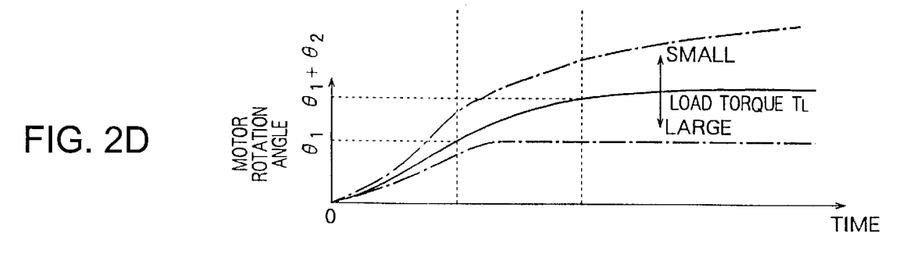

<u>Page 20,</u>
Line 11, delete "Fig. 2" and insert -- Fig. 2C --.
Line 13, delete "Fig. 2" and insert -- Figs. 2B-2D --.

Signed and Sealed this

Fifth Day of February, 2002

*Attest:*

*Attesting Officer*

JAMES E. ROGAN
*Director of the United States Patent and Trademark Office*